(12) United States Patent
Gabler et al.

(10) Patent No.: US 7,530,628 B2
(45) Date of Patent: May 12, 2009

(54) VEHICLE IMPACT PROTECTION SYSTEM

(75) Inventors: Michael Gabler, Muehldorf am Inn (DE); Christian Herget, Mettenheim (DE); Achim Hofmann, Tuessling (DE); Detlef Last, Muehldorf am Inn (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 0 days.

(21) Appl. No.: 12/001,171

(22) Filed: Dec. 10, 2007

(65) Prior Publication Data
US 2008/0143145 A1  Jun. 19, 2008

(30) Foreign Application Priority Data
Dec. 19, 2006  (DE) ........................ 10 2006 060 052

(51) Int. Cl.
*B60J 5/04* (2006.01)
(52) U.S. Cl. .............................. 296/187.12; 296/146.6; 296/187.03
(58) Field of Classification Search .............. 296/146.6, 296/187.12, 187.03; 49/502
See application file for complete search history.

(56) References Cited

U.S. PATENT DOCUMENTS 6,846,033 B2  1/2005  Chu et al.

2006/0125291 A1 *  6/2006  Buravalla et al. ........... 296/204

FOREIGN PATENT DOCUMENTS

| DE | 19736100 | 2/1998 |
|----|----------|--------|
| DE | 19828444 | 12/1999 |
| DE | 19918158 | 11/2000 |
| DE | 19963068 | 6/2001 |
| DE | 10341329 | 4/2005 |

* cited by examiner

*Primary Examiner*—Joseph D Pape
(74) *Attorney, Agent, or Firm*—Tarolli, Sundheim, Covell & Tummino LLP

(57) ABSTRACT

A vehicle impact protection system (10) includes a vehicle outer wall (16), a vehicle inner wall (14), the vehicle outer wall (16) and the vehicle inner wall (14) defining a mounting space (18) between them, and an elongated reinforcing profile (20) housed in the mounting space (18) and having a profile longitudinal axis (A), the reinforcing profile (20) being connected with an actuator device (28), an activation of the actuator device (28) leading to a change in curvature of said profile longitudinal axis (A) such that the profile longitudinal axis (A) is curved more intensively outwards towards the vehicle outer wall (16) after the activation of the actuator device (28) than before the activation.

14 Claims, 3 Drawing Sheets a)

b)

VEHICLE IMPACT PROTECTION SYSTEM

TECHNICAL FIELD

The invention relates to a vehicle impact protection system.

BACKGROUND OF THE INVENTION

Vehicle impact protection systems are generally known and described in the prior art. Thus, for example, U.S. Pat. No. 6,846,033 B2 describes a conventional side impact protection system constructed as a vehicle door.

Additionally, in order to reduce the weight of the vehicle impact protection system while maintaining a substantially identical protective effect, a device for reinforcing the passenger compartment of a motor vehicle is already disclosed in DE 199 18 158 A1, the device providing a hollow profile as a reinforcing element for strengthening the structure. If a critical impact force occurs, a gas generator is activated which acts upon this hollow profile with an internal pressure. As a result of the rising internal pressure, the bending resistance of the reinforcing element increases and hence the energy absorption capability of a vehicle structure which is reinforced in such a way.

It is an object of the invention to further increase the energy absorption capability of a vehicle impact protection system by simple means and to thereby achieve improved occupant safety.

BRIEF SUMMARY OF THE INVENTION

This is achieved by a vehicle impact protection system including a vehicle outer wall, a vehicle inner wall, the vehicle outer wall and the vehicle inner wall defining a mounting space between them, and an elongated reinforcing profile housed in the mounting space and having a profile longitudinal axis, the reinforcing profile being connected with an actuator device, an activation of the actuator device leading to a change in curvature of the profile longitudinal axis such that the profile longitudinal axis is curved more intensively outwards towards the vehicle outer wall after the activation of the actuator device than before the activation.

In addition, the object is also achieved by a vehicle impact protection system including a vehicle outer wall, a vehicle inner wall, the vehicle outer wall and the vehicle inner wall defining a mounting space between them, and an elongated reinforcing profile housed in the mounting space and having a profile longitudinal axis, the reinforcing profile being connected with an actuator device, and the reinforcing profile having different section moduli transverse to a rotation axis which runs through a first fastening point and a second fastening point of the reinforcing profile, the actuator device being able to swivel the reinforcing profile about the rotation axis starting from an initial position, so that the section modulus of the reinforcing profile from the vehicle outer wall towards the vehicle inner wall against bending is greater after the activation of the actuator device than in the initial position. It is thereby achieved by the invention that, after detecting an (imminent) impact, the reinforcing profile assumes a position in which it is arched towards an impact member. This means that the impact member acts on the reinforcing profile before it reaches an imaginary straight line which is determined by two fastening points of the reinforcing profile. The restraining of the impact member therefore begins further away from the occupant than is usual in the prior art, so that the deformation path of the profile is extended up to reaching the occupant. Furthermore, the mechanical deformation advantages of an arch structure are utilized, the rigidity and energy absorption capability of which are distinctly higher, with less deformation, compared to a straight bending structure. Consequently, the safety of the occupants improves with such an embodiment of the vehicle impact protection system according to the invention when the impact member impinges onto the vehicle.

For cases where the actuator device swivels the reinforcing profile about the rotation axis, the reinforcing profile is preferably rotated through approximately 90° with respect to its initial position, after the actuator device is activated. With a rotation of the reinforcing profile through 90°, two requirements are particularly advantageously met with regard to a vehicle part which is constructed as a vehicle impact protection system: On the one hand, the possibility of constructing the vehicle part so as to be very slender in the initial position of the reinforcing profile and, on the other hand, a maximum occupant impact protection after the actuator device is activated.

In one embodiment, after the actuator device is activated the profile longitudinal axis is arched laterally outwards towards the vehicle outer wall between a first fastening point of the reinforcing profile and a second fastening point of the reinforcing profile. An impact member thereby impinges onto the vehicle part, which is constructed as a vehicle impact protection system, in the crown region of a resistant arch structure, so that undesired deformations of the vehicle part towards the occupant are reduced.

The distance between a first fastening point and a second fastening point of the reinforcing profile can assume a first value before the actuator device is activated, and a second value after the actuator device is activated, the second value being smaller than the first value. Through the possibility of reducing the distance between the fastening points, the deformation of an originally straight reinforcing profile into an arched or curved reinforcing profile is particularly readily possible.

The reinforcing profile preferably has a first fastening point and a second fastening point, the second fastening point being movable towards the first fastening point, and a security mechanism being provided at the second fastening point, which prevents a movement in an opposite direction. As already mentioned above, a reduction of the distance of the fastening points is advantageous for reaching a marked arching or curvature of the reinforcing profile. After this arch-like structure has been formed, however, the rigidity is substantially higher in the case of an impact, if the distance of the fastening points can not increase again.

In a further embodiment, the actuator device includes a linear actuator which, when it is activated, acts upon a second fastening point of the reinforcing profile towards a first fastening point of the reinforcing profile. Through this longitudinal pressure action, a curvature in the reinforcing profile is intensified or produced. In order that the reinforcing profile curves or arches in the desired direction, namely towards the vehicle outer wall, a profile cross-section of the reinforcing profile is to be selected in a suitable manner and/or a slight prior curvature is to be provided in this direction.

In a further embodiment, the reinforcing profile is a hollow profile, and the actuator device includes a gas generator which can load the reinforcing profile with an internal pressure. As a result of this loading action with internal pressure by means of the gas generator, an additional increase in rigidity is produced by the internal pressure in addition to the increased energy absorption capability through the curvature of the reinforcing profile. Of course, the said variants can also be combined with each other.

The hollow profile, which is constructed as a reinforcing profile, preferably has differing wall thicknesses in the profile cross-section. With such a selection of the profile cross-section, two advantageous effects can be achieved by the gas generator: Firstly, the reinforcing of the hollow profile as a result of the loading with internal pressure, and secondly an arching of the hollow profile as a result of the loading with internal pressure and the different wall thicknesses.

In this case, the wall thickness of the reinforcing profile is particularly preferably less on a side facing the vehicle outer wall than on a side facing the vehicle inner wall. It is thereby ensured that the reinforcing profile arches or curves towards the vehicle outer wall when it is acted upon by internal pressure.

In one embodiment, the reinforcing profile already has a prior curvature before the actuator device is activated. In some variants, this prior curvature is very slightly defined and merely establishes the direction in which the reinforcing profile is to curve more strongly when the actuator device is activated. In other variant embodiments, a relatively intensive prior curvature is already present, with the plane of curvature before the actuator device is activated lying in a plane of the vehicle part which is constructed as the vehicle impact protection system, i.e. for example in the plane of a vehicle door. When the actuator device is activated, a further intensifying of the curvature can then possibly be dispensed with; the reinforcing profile is merely swiveled until it is arched outwards towards the outer wall between a first fastening point and a second fastening point.

When the actuator device is activated, the reinforcing profile can deform the vehicle outer wall outwards, so that the distance between the vehicle outer wall and the vehicle inner wall is greater after the actuator device has been activated than before it has been activated. As a result of the outward deformation of the vehicle outer wall, the distance between the vehicle impact protection system and a vehicle occupant increases. The possible deformation path of the vehicle part which is constructed as a vehicle impact protection system until touching the occupant is thereby increased. The corresponding vehicle parts can therefore be manufactured so as to be very slender and only move outwards or deform in the case of an imminent impact, in order to increase the deformation path.

DETAILED DESCRIPTION OF THE PREFERRED EMBODIMENTS

Figure 1:
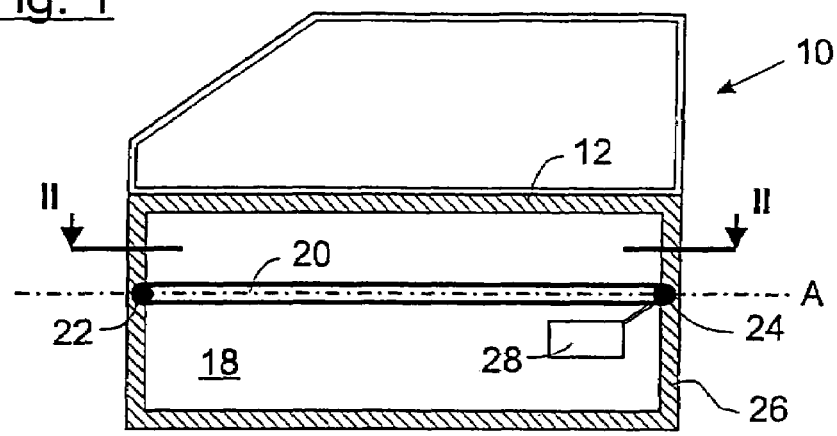
FIG. 1 shows a sectional view of a vehicle door, constructed as a vehicle impact protection system according to the invention, in accordance with one embodiment.

FIG. 1 shows diagrammatically a vehicle door 10, which is constructed as a vehicle impact protection system. The illustration of the vehicle door 10 is to be understood here as being merely by way of example, because other vehicle parts, in particular flat vehicle boundaries (roof, side wall etc.) can also be constructed as a vehicle impact protection system. The necessary inherent stability and rigidity of the vehicle door 10 are ensured by a door frame 12, illustrated by hatching, on which a vehicle inner wall 14 and a vehicle outer wall 16 are mounted (cf. FIG. 2). The vehicle inner wall 14 and the vehicle outer wall 16 define between them a mounting space 18 in which a reinforcing profile 20 with a profile longitudinal axis A is housed. The reinforcing profile 20 is mounted in a first fastening point 22 and in a second fastening point 24 on vertical door struts 26 of the door frame 12. Apart from the reinforcing profile 20, in addition an actuator device 28 is housed in the mounting frame 18, the actuator device 28 being connected with the reinforcing profile 20.

Figure 2:
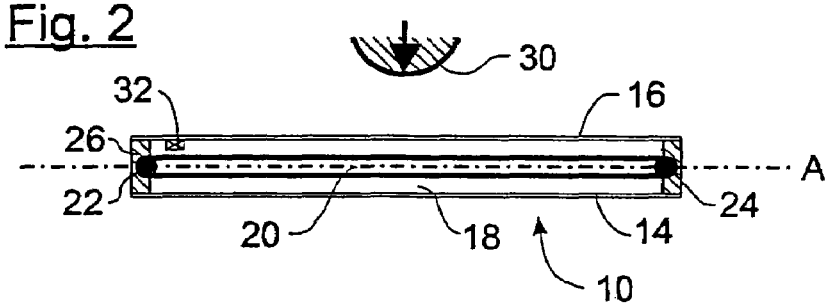
FIG. 2 shows a section through the vehicle door according to FIG. 1 before the actuator device is activated.

FIG. 2 shows a horizontal section II-II through the vehicle door 10 according to FIG. 1, in which an impact member 30 is illustrated on the side of the vehicle outer wall 16, which member moves towards the vehicle door 10. The vehicle door 10, constructed as a vehicle impact protection system, comprises at least one sensor 32 which detects a collision with the impact body 30 and can activate the actuator device 28. Particularly preferably, the sensor 32 already detects an imminent collision with the impact member 30, i.e. it already activates the actuator device before the impact member 30 impinges onto the vehicle outer wall 16.

Although the elongated reinforcing profile 20 in FIGS. 1 and 2 extends in the horizontal direction, embodiments of the vehicle impact protection system are of course conceivable in which the reinforcing profile 20 extends diagonally or vertically in the plane of the vehicle door 10.

Figure 3:
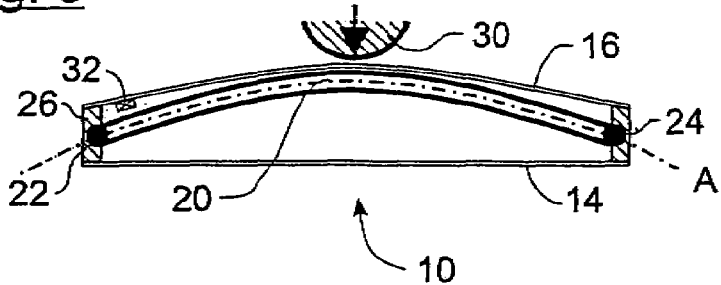
FIG. 3 shows a section through the vehicle door according to FIG. 1 after the actuator device is activated.

FIG. 3 shows the horizontal section II-II of FIG. 2 after the actuator device 28 has been activated. The activation of the actuator device 28 has led here to a change in the curvature of the profile longitudinal axis A such that the profile longitudinal axis A is curved more intensively outwards towards the vehicle outer wall 16 than before the activation. In the illustrated example according to FIG. 3, the reinforcing profile 20 has deformed the vehicle outer wall 16 outwards so that the distance between the vehicle outer wall 16 and the vehicle inner wall 14 is greater after the actuator device 28 has been activated (FIG. 3) than before the actuator device 28 has been activated (FIG. 2).

In alternative variant embodiments, the original distance of the vehicle inner wall 14 from the vehicle outer wall 16 can already be so great and/or the curvature of the reinforcing profile 20 can be selected to be so small that no deformation of the vehicle outer wall 16 takes place as a result of an activation of the actuator device 28. The advantage of this alternative variant lies in that the vehicle door 10 would remain largely undamaged and no complete replacement would be necessary in case of an erroneous activation of the actuator device 28. However, a disadvantage here is the generally undesirably great thickness of the vehicle door 10.

As can be readily seen in FIG. 3, instead of impinging onto a straight bending structure, the impact member 30 impinges onto a curved reinforcing profile 20, with the development of an arching effect. Owing to this arching effect, the deformation of the curved profile towards the vehicle inner wall 14 is substantially less than the deformation of a straight profile having an identical cross-section, with the same input of energy.

Figure 4:
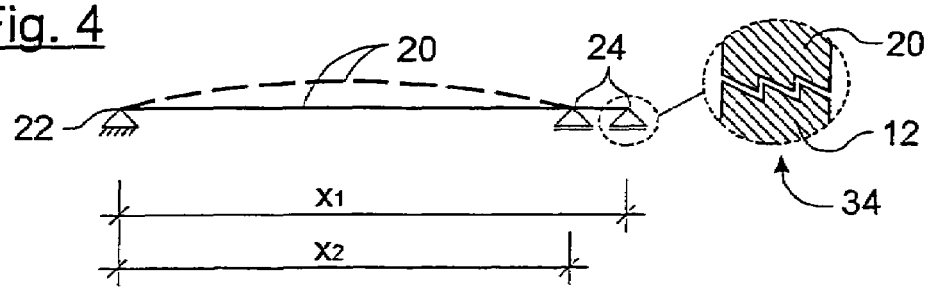
FIG. 4 shows a diagrammatic sketch for the bearing of a reinforcing profile of a vehicle impact protection system according to the invention.

FIG. 4 shows diagrammatically and in idealized form a preferred bearing of the reinforcing profile 20 in the fastening points 22, 24, in which the desired effect of an increased bending- or deformation resistance of the reinforcing profile 20 can be seen particularly clearly. The reinforcing profile 20 is mounted here in the first fastening point 22 so as to be articulatedly rotatable and immovable horizontally and vertically, and held in the second fastening point 24 so as to be articulatedly rotatable but only vertically immovable. The second fastening point 24 is mounted so as to be movable in the horizontal direction, so that when the actuator device 28 is activated, it does not prevent the deformation of the straight reinforcing profile 20 (illustrated in a solid line) into a curved reinforcing profile 20 (illustrated in a dashed line). With this deformation of the reinforcing profile 20, the distance between the first fastening point 22 and the second fastening point 24 reduces from a first value $x_1$ to a second value $x_2$.

Particularly preferably, the bearing of the second fastening point 24 is constructed so that the second fastening point 24 is in fact movable towards the first fastening point 22, but is prevented from moving in the opposite direction by a security mechanism 34. In a detail portion on the right-hand side of FIG. 4, a saw-tooth engagement is illustrated as an example of such a security mechanism 34. The saw-tooth engagement makes possible a movement of the reinforcing profile 20 relative to the door frame 12 towards the left, but blocks an opposite movement towards the right. The arching effect of the curved reinforcing profile 20 is consequently fully maintained in the case of stressing by the impact member 30, and is not weakened by a bearing displacement.

In order to deform the originally straight reinforcing profile 20 (FIG. 2) into an arched/curved reinforcing profile 20 (FIG. 3), in one embodiment the actuator device 28 includes a linear actuator which, when it is activated, acts upon the second fastening point 24 towards the first fastening point 22 of the reinforcing profile 20. So that the reinforcing profile 20 curves or arches under the longitudinal pressure in the desired direction towards the vehicle outer wall 16, a slight prior curvature can already be provided in this direction in the initial state of the reinforcing profile 20. Alternatively or in addition, the direction of curvature can also be established by a suitable choice of the profile cross-section.

Figure 5:
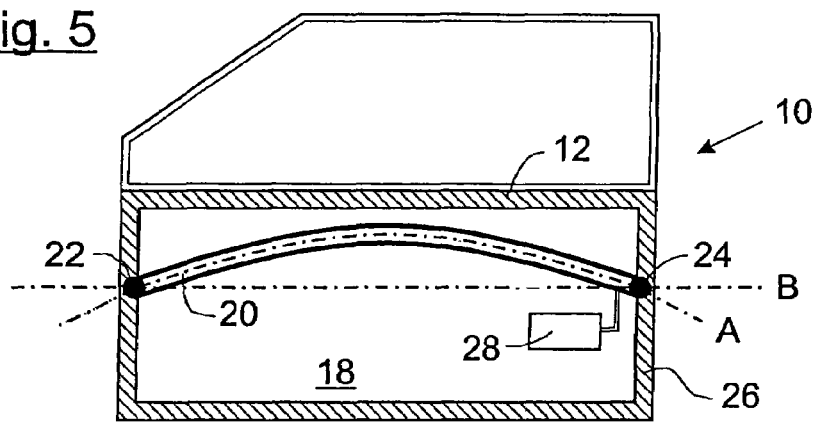
FIG. 5 shows a sectional view of a vehicle door constructed as a vehicle impact protection system according to the invention, in accordance with a further embodiment.

FIG. 5 shows a sectional view of the vehicle door 10, constructed as a vehicle impact protection system, in another embodiment. Unlike the embodiment described above, the reinforcing profile 20 already has a prior curvature in the plane of the vehicle door 10 here, which becomes clear through the curved profile longitudinal axis A. In an analogous manner to the preceding embodiments, the reinforcing profile 20 is mounted in the first fastening point 22 and in the second fastening point 24 on the door frame 12, with the fastening points 22, 24 establishing a rotation axis B. In this case, the actuator device 28 includes a rotation actuator which swivels the reinforcing profile 20, starting from an initial position (FIG. 5), about the rotation axis B, so that after this, the reinforcing profile assumes a position according to FIG. 3. By the rotation of the reinforcing profile 20 through 90°, the reinforcing profile 20 is no longer curved in the door plane but is curved perpendicularly thereto. The section modulus of the reinforcing profile 20 against bending, viewed from the vehicle outer wall 16 towards the vehicle inner wall 14, thereby increases, which leads to a smaller deformation of the vehicle door 10 on impingement of the impact member 30.

Figure 6:
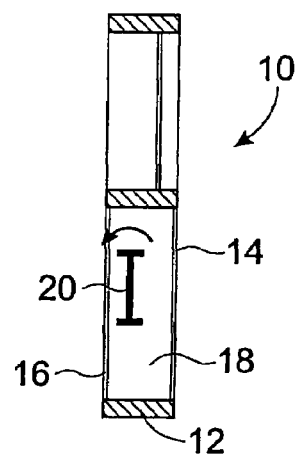
FIG. 6 shows a vertical section through a vehicle door constructed as a vehicle impact protection system according to the invention, in accordance with a further embodiment.

FIG. 6 shows a vertical section through the vehicle door 10, which is constructed as a vehicle impact protection system according to a further embodiment. In an analogous manner to the previously mentioned embodiment according to FIG. 5, the actuator device 28 includes a rotation actuator which swivels the reinforcing profile 20 with respect to its profile axis A or rotation axis B through 90°. The different section moduli, viewed from the vehicle outer wall 16 towards the vehicle inner wall 14, do not occur in this embodiment by a prior curvature of the reinforcing profile 20, but rather by the choice of a suitable profile cross-section. In FIG. 6, for example, a high I-beam is selected which, in its illustrated initial position, has a high section modulus against bending in the vertical direction and a low section modulus against bending in the horizontal direction. If this beam is rotated by the actuator device 28 (cf. arrow in FIG. 6), then the high section modulus is in the horizontal direction which is determinative for the impingement of the impact member 30.

Generally, on rotation of the reinforcing profile 20, the vehicle outer wall 16 will deform outwards, so that the distance between the vehicle outer wall 16 and the vehicle inner wall 14 is greater after an activation of the actuator device 28 than before an activation of the actuator device 28. Only exceptionally, with a suitable thickness of the vehicle door 10 and a corresponding profile cross-section of the reinforcing profile 20 given, a free rotation of the reinforcing profile 20 is possible in the mounting space 18, without the vehicle inner wall 14 and the vehicle outer wall 16 being deformed.

In a further embodiment, for the construction and mode of operation of which reference is to be made to the description of the embodiment according to FIGS. 1 to 4, the actuator device 28 includes a gas generator which acts with an internal pressure on the reinforcing profile, constructed as a hollow profile. The gas generator here can replace the linear actuator described in FIGS. 1 to 4, or can be additionally present.

Figure 7:
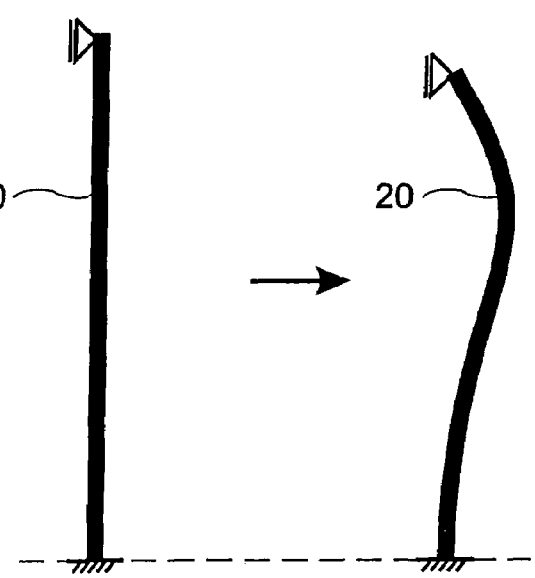
FIG. 7 shows the deformation of a reinforcing profile of a vehicle impact protection system according to the invention, as a result of being acted upon by internal pressure.

For this, a possible bearing of the straight reinforcing profile 20 is illustrated diagrammatically on the left-hand side in FIG. 7, before the gas generator is activated, whilst on the right-hand side the same reinforcing profile 20 can be seen after the gas generator has been activated. The first fastening point 22 is held here so as to be locked against relative rotation, so that there is scarcely any change in curvature by the action of internal pressure in the region of this fastening. The statement that the activation of the actuator device 28 leads to a change in curvature of the profile longitudinal axis A of the reinforcing profile 20 such that the profile longitudinal axis A of the reinforcing profile 20 is curved more intensively outwards after the activation than before the activation is to be understood accordingly to mean that the reinforcing profile 20 as a whole curves in fact more intensively outwards, but not necessarily on every partial section along its profile longitudinal axis A.

Figure 8:
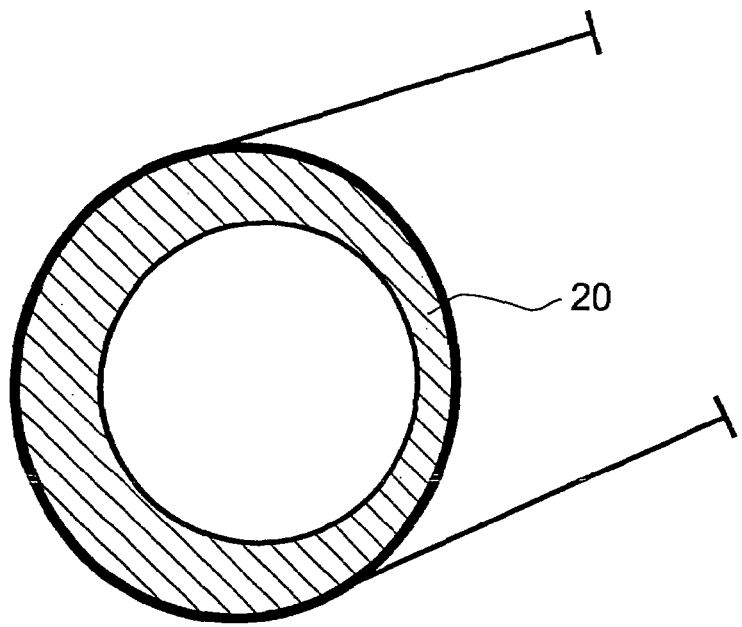
FIGS. 8a and 8b show two example reinforcing profile cross-sections for a vehicle impact protection system according to the invention.
Figure 8:
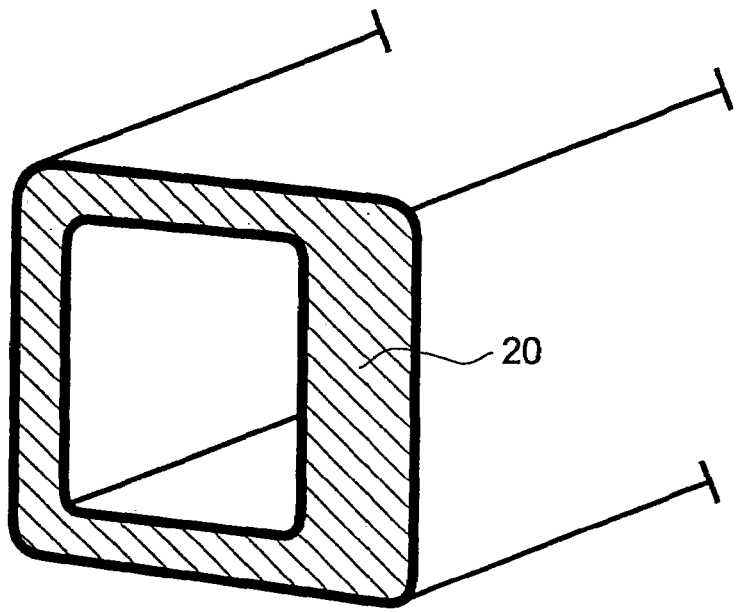

FIGS. 8a and 8b show by way of example two suitable hollow profile cross-sections for reinforcing profiles 20, by which an originally straight reinforcing profile 20 assumes curved deformation shapes on action by internal pressure (cf. FIGS. 3 and 7). Both the tubular profile in FIG. 8a and the rectangular profile in FIG. 8b are distinguished in that they have different wall thicknesses viewed over the cross-section. If hollow profiles of this type are installed into a vehicle impact protection system so that the wall thickness of the reinforcing section 20 on a side facing the vehicle outer wall 16 is smaller than on a side facing the vehicle inner wall 14, the reinforcing profile 20 deforms towards the vehicle outer wall 16 as shown in FIG. 3.

The invention claimed is:

1. A vehicle impact protection system comprising:
   a vehicle outer wall (16),
   a vehicle inner wall (14), said vehicle outer wall (16) and said vehicle inner wall (14) defining a mounting space (18) between them, and
   an elongated reinforcing profile (20) housed in said mounting space (18) and having a profile longitudinal axis (A),
   said reinforcing profile (20) being connected with an actuator device (28),
   an activation of said actuator device (28) leading to a change in curvature of said profile longitudinal axis (A) such that said profile longitudinal axis (A) is curved more intensively outwards towards said vehicle outer wall (16) after said activation of said actuator device (28) than before said activation,
   wherein said reinforcing profile (20) has a first fastening point (22) and a second fastening point (24), said second fastening point (24) being movable towards said first fastening point (22), a security mechanism (34) being provided at said second fastening point (24), said security mechanism (34) preventing a movement in an opposite direction.

2. A vehicle impact protection system comprising:
   a vehicle outer wall (16), a vehicle inner wall (14), said vehicle outer wall (16) and said vehicle inner wall (14) defining a mounting space (18) between them, and an elongated reinforcing profile (20) housed in said mounting space (18) and having a profile longitudinal axis (A), said reinforcing profile (20) being connected with an actuator device (28), wherein said reinforcing profile (20) has different section moduli transverse to a rotation axis (B) which runs through a first fastening point (22) and a second fastening point (24) of said reinforcing profile (20), said actuator device (28) being able to swivel said reinforcing profile (20) about said rotation axis (B) starting from an initial position, such that said section modulus of said reinforcing profile (20) from said vehicle outer wall (16) towards said vehicle inner wall (14) is greater after said activation of said actuator device (28) than in said initial position.

3. The vehicle impact protection system according to claim 2, wherein after said activation of said actuator device (28), said reinforcing profile (20) is rotated through approximately 90° with respect to said initial position.

4. The vehicle impact protection system according to claim 1, wherein after said activation of said actuator device (28), said profile longitudinal axis (A) is arched laterally outwards towards said vehicle outer wall (16) between a first fastening point (22) of said reinforcing profile (20) and a second fastening point (24) of said reinforcing profile (20).

5. The vehicle impact protection system according to claim 1, wherein a distance between a first fastening point (22) and a second fastening point (24) of said reinforcing profile (20) assumes a first value ($x_1$) before said activation of said actuator device (28), and a second value ($x_2$) after said activation of said actuator device (28), said second value ($x_2$) being smaller than said first value ($X_1$).

6. The vehicle impact protection system according to claim 1, wherein said actuator device (28) includes a linear actuator which, when it is activated, acts upon a second fastening point (24) of said reinforcing profile (20) towards a first fastening point (22) of said reinforcing profile (20).

7. A vehicle impact protection system comprising:
   a vehicle outer wall (16),
   a vehicle inner wall (14), said vehicle outer wall (16) and said vehicle inner wall (14) defining a mounting space (18) between them, and
   an elongated reinforcing profile (20) housed in said mounting space (18) and having a profile longitudinal axis (A),
   said reinforcing profile (20) being connected with an actuator device (28),
   an activation of said actuator device (28) leading to a change in curvature of said profile longitudinal axis (A) such that said profile longitudinal axis (A) is curved more intensively outwards towards said vehicle outer wall (16) after said activation of said actuator device (28) than before said activation,
   wherein said reinforcing profile (20) is a hollow profile, said actuator device (28) including a gas generator which can act upon said reinforcing profile (20) with an internal pressure.

8. The vehicle impact protection system according to claim 1, wherein said reinforcing profile (20) is a hollow profile with a differing wall thickness.

9. The vehicle impact protection system according to claim 8, wherein said wall thickness of said reinforcing profile (20) is smaller on a side facing said vehicle outer wall (16) than on a side facing said vehicle inner wall (14).

10. The vehicle impact protection system according to claim 1, wherein said reinforcing profile (20) has a prior curvature before said activation of said actuator device (28).

11. A vehicle impact protection system comprising:
    a vehicle outer wall (16),
    a vehicle inner wall (14), said vehicle outer wall (16) and said vehicle inner wall (14) defining a mounting space (18) between them, and
    an elongated reinforcing profile (20) housed in said mounting space (18) and having a profile longitudinal axis (A),
    said reinforcing profile (20) being connected with an actuator device (28),
    wherein said reinforcing profile (20) deforms said vehicle outer wall (16) outwards when said actuator device (28) is activated, so that a distance between said vehicle outer wall (16) and said vehicle inner wall (14) is greater after said activation of said actuator device (28) than before said activation of said actuator device (28).

12. The vehicle impact protection system according to claim 7, wherein said reinforcing profile (20) is a hollow profile with a differing wall thickness.

13. The vehicle impact protection system according to claim 12, wherein said wall thickness of said reinforcing portion (20) is smaller on a side facing said vehicle outer wall (16) than on a side facing said vehicle inner wall (14).

14. The vehicle impact protection system according to claim 7, wherein said reinforcing portion (20) has a prior curvature before said activation of said actuator device (28).

* * * * *